United States Patent [19]

Kiuchi et al.

[11] Patent Number: 4,654,665
[45] Date of Patent: Mar. 31, 1987

[54] RADAR SYSTEM

[75] Inventors: Eiichi Kiuchi; Yuichi Tomita; Toshiyuki Izutani, all of Tokyo, Japan

[73] Assignee: NEC Corporation, Tokyo, Japan

[21] Appl. No.: 633,438

[22] Filed: Jul. 23, 1984

[30] Foreign Application Priority Data

Jul. 21, 1983 [JP] Japan ................. 58-133344

[51] Int. Cl.$^4$ ............................. G01S 13/52
[52] U.S. Cl. ..................... 342/160; 342/88
[58] Field of Search ............... 343/7.7, 17.1 PF, 16 R, 343/17.2 A, 9 A

[56] References Cited

U.S. PATENT DOCUMENTS 3,441,930  4/1969  van den Broek d'Obrenan ... 343/7.7
3,750,152  7/1973  Waful ............................. 343/16 R Primary Examiner—Stephen C. Buczinski
Assistant Examiner—Donald E. Hayes
Attorney, Agent, or Firm—Schwartz, Jeffery, Schwaab, Mack, Blumenthal & Evans

[57] ABSTRACT

A radar system comprises means for forming a transmission pulse signal as m sets of n pulses, the individual sets having respective PRPs Ti (i=1, 2, . . . , m) moving target detection means, and angle measurement means utilizing beam-to-beam amplitude comparison and interpolation for a given moving target. Beam-to-beam amplitude comparison and interpolation is carried out at least twice for one target by making use of a pair of video signals with the same PRP processed by the moving target detection means. The angle measurement is achieved through a predetermined correlation processing over thus obtained interpolated angle values for a target.

1 Claim, 6 Drawing Figures

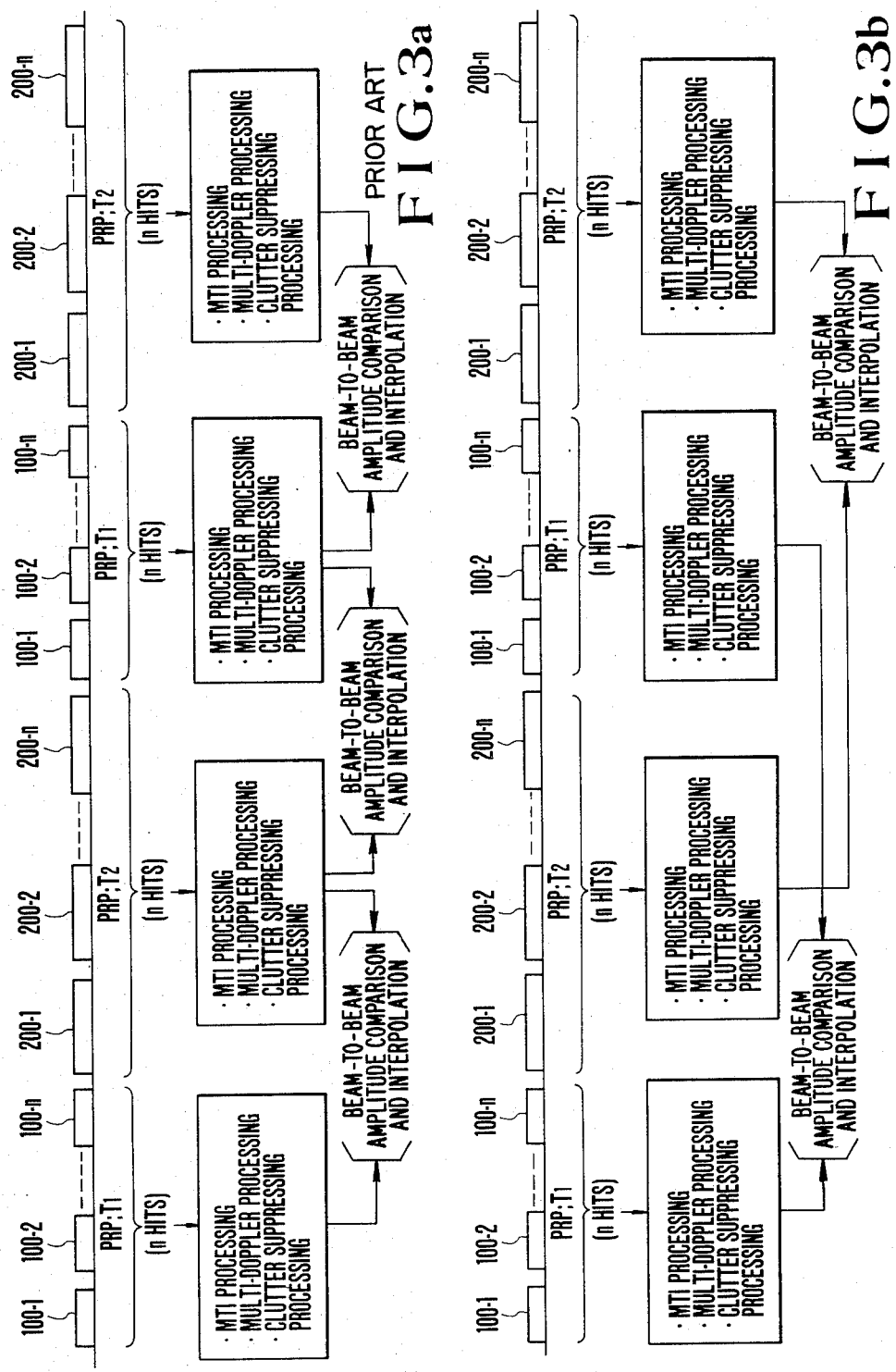

RADAR SYSTEM

BACKGROUND OF THE INVENTION

This invention to a radar system and, more particularly, to a radar system with moving target detection means including a DMTI (digital moving target indicator) and an nth order MDF (multi-doppler filter), which can improve the angle measurement accuracy of the moving target.

In pulse radar system detecting various targets such as aircrafts, ships and vehicles pulse signals received from the stationary objects are removed by means of the DMTI noted above. DMTI is generally used in conventional pulse radar systems, however, it has the problem of blind speed that occurs in relation to the pulse repetition frequency. In order to cope with this problem, it has been in practice to vary the PRP (pulse repetition period) of the transmitted pulse.

Besides the reflected pulse signals from moving targets, signals from the sea surface, rain drops and forests have Doppler frequency components corresponding to the relative speeds of these objects to radar. These components cannot always be removed by means of DMTI and often causes the detection performance degradation of the moving target. To solve this problem, FFT (fast Fourier transform) processing has been made use of as a means for discriminating the pulse signal from a given moving target from the moving clutter signal noted above. Recently, there has been employed an MDF (multi-Doppler filter) processing in order to further improve discriminating performance of the moving target from the moving clutter.

MDF processing, however, like the case of the FFT, has a restriction that basically it is necessary to use transmission pulse signals having a fixed PRP. Therefore, pulse-to-pulse staggered PRP cannot be used in MDF processing radar. In order to improve the target detection performance against blind speed, group staggered PRP can be effectively employed. In group staggered PRP, generally m (being an integer greater than unity) different sets of staggered PRP are cyclically used. And in each set of staggered PRP, generally n (being an integer greater than unity) pulses are transmitted in a fixed PRP.

In the prior art radar systems, the angular position of the moving target is measured through beam-to-beam amplitude comparison and interpolation over successively received pulse signals, the amplitude of which varies according to the antenna pattern. FIG. 1a is a block diagram showing an essential part of a prior art radar system that is related to the function of angle measurement.

Referring to FIG. 1a, a coherent video signal is fed to a MTI processor 1 for analog-to-digital conversion and a subsequent MTI canceller processing. Through the MTI canceller processing, the coherent video signals from the stationary object and the moving target with the blind speed are cancelled. The MTI processed signals are fed to a multi-Doppler processor 2 which includes a plurality of MDFs with n or less stages corresponding to the number of transmitting pulses with a fixed PRP. The input signals are separated and divided into different filter banks by making use of the Doppler frequency difference. These outputs are fed to a clutter suppressing processor 3.

In the clutter suppression processor 3, signals are subjected to scan canceller processing and/or LOG/C-FAR (constant false alarm rate) processing on the filter by filter basis, and the ground clutter and the moving clutter are suppressed. The resultant clutter suppressed signals out of each filter bank are combined to be a processed video signal. The processed video signal is in the form of a series of signals each signal of which corresponds to each set of n coherent video signals. This signal is fed to an angle detector 4.

The angle detector 4 calculates the angular position of a given moving target through a beam-to-beam amplitude comparison and interpolation over successively received signals.

FIG. 3a is a view illustrating the procedure of angle measurement of the moving target noted above in prior art radar systems, where a pair of PRPs, T1 and T2 are used. Referring to the Figure, the successively received n-hit signals, 100-1 to 100-$n$ with the PRP of T1 and a successive n-hit signals 200-1 to 200-$n$ with the PRP of T2, are fed to the MTI processor 1.

The signal 100-1, shown in FIG. 3a is usually in the form of a series of coherent video signals that are received and demondulated in correspondence to range direction sweep in the radar. The coherent video signals in one sweep time period include one coherent video signal corresponding to a given moving target in correspondence to the angle and range thereof. Therefore, the set of signals 100-1 to 100-$n$ include n hits of coherent video signals with the fixed PRP of T1 corresponding to the given moving target. Similarly, the set of signals 200-1 to 200-$n$ include n hits of coherent video signals with the fixed PRP of T2 corresponding to the given moving target.

Each set of the signals 100-1 to 100-$n$ or 200-1 to 200-$n$ are fed through the MTI processor 1, multi-Doppler processor 2 and clutter suppression processor 3 to obtain the processed video signal. The processed video signal is fed to the angle detector 4 for the angle measurement of the moving target. In the prior art radar system, the beam-to-beam amplitude comparison and interpolation is performed over successive processed videos which have different PRPs, as shown in FIG. 3a. FIG. 2a shows typical beam-to-beam amplitude comparison in this case. Point A represents the amplitude of the processed video signal amplitude pattern 51 extracted from the set of signals 100-1 to 100-$n$ with the PRP of T1. Point B represents the amplitude of the processed video signal amplitude pattern 52 extracted from the set of signals 200-1 to 200-$n$ with the PRP of T2. In the Figure, the ordinate line 57 indicates the angle of the given moving target. The beam-to-beam amplitude comparison and interpolation is performed by making use of the amplitudes represented by the points A and B, and the angular position of the moving target 57 is obtained.

In the prior art radar system as described, however, if the relative speed of the given moving target associated with the radar is equal to the blind speed at either PRP of T1 or T2, A or B will not be present as is obvious from FIG. 2a. In such a case, it is impossible to detect the angle of the moving target.

SUMMARY OF THE INVENTION

An object of the invention is to provide a radar system which can obviate the above disadvantage and can give reliable angle measurement of the given moving target at all times irrespective of the blind speed.

According to the invention, there is provided a radar system comprising means for forming a transmission pulse signal as m (m being an integer greater than unity) sets of n pulses, the individual sets having respective PRPs Ti (i=1, 2, . . ., m); moving target detection means; and angle measurement means utilizing beam-to-beam amplitude comparison and interpolation for a given moving target. Beam-to-beam amplitude comparison and interpolation is carried out at least twice for one target by making use of a pair of video signals with the same PRP processed by the moving target detection means. And angle measurement is achieved through a predetermined correlation processing over thus obtained interpolated angle values for a target.

BRIEF DESCRIPTION OF THE DRAWINGS

FIGS. 3a and 3b are diagrams illustrating the procedure of angle measurement in the prior art radar system and the embodiment of the invention, respectively.

DESCRIPTION OF PREFERRED EMBODIMENT

Now, the invention will be described by way of example with reference to the drawings.

Figure 1A:
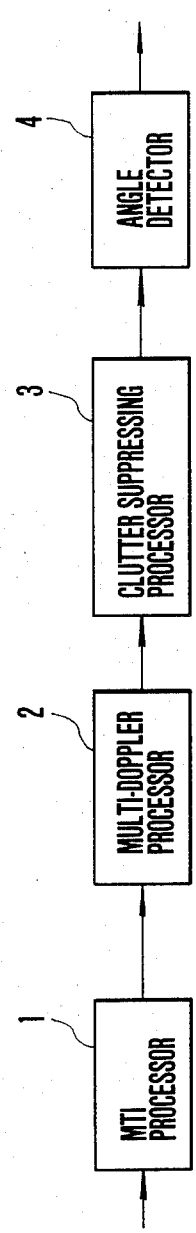
FIGS. 1a and 1b are block diagrams showing the essential part of a prior art radar system and an embodiment of the radar system according to the invention, respectively, related to an angle measurement function.
Figure 1B:
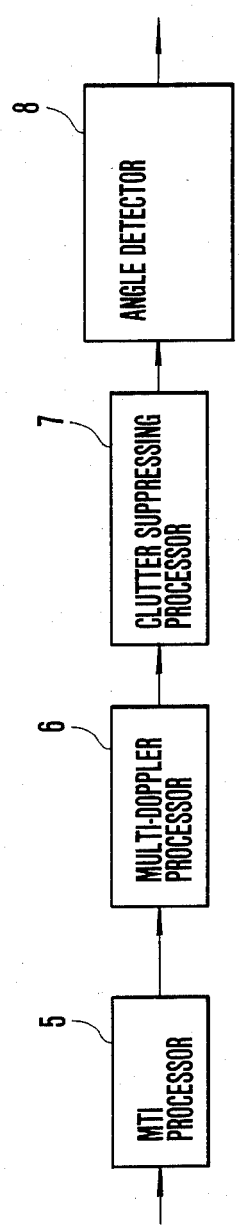

FIG. 1b is a block diagram showing an essential part of an embodiment of the invention related to the function of angle measurement. Referring to the figure, the essential part includes a MTI processor 5, a multi-Doppler processor 6, a clutter suppression processor 7 and an angle detector 8.

Referring to FIG. 1b, a coherent video signal corresponding to the given moving target is coupled through the MTI processor 5, multi-Doppler processor 6 and clutter suppression processor 7. Through a signal processing similar to that in the case of the prior art radar system shown in FIG. 1a, a processed video signal free from the ground clutter and moving clutter is provided from the clutter suppression processor 7. The processed video signal, like that in the case of the prior art radar system, is provided as a series of video signals corresponding to the group staggered PRP, where each video signal is produced from n hits of MTI processed video signals. This processed video signal is fed to the angle detector 8. The detector 8 measures the angular position of the given moving target through a predetermined beam-to-beam amplitude comparison and interpolation processing as described previously.

FIG. 3b shows an angle measurement procedure according to an embodiment of the invention where m =2, that is, the PRPs are T1 and T2. Referring to FIG. 3b, the pulse signal reflected from a given moving target includes, in correspondence to the group staggered PRP, a set of signals 100-1 to 100-n of n hits with a PRP of T1 and a set of signals 200-1 to 200-n of n hits with a PRP of T2. The pulse signal is processed through the MTI processor 5, multi-Doppler processor 6 and clutter suppressor 7 in the manner described previously. Consequently, processed video signals corresponding to the sets of signals with PRPs T1 and T2 are delivered out. Being different from the prior art system, the radar system of this invention ensures that the beam to-beam amplitude comparison and interpolation can be performed by making use of processed video signals with the same PRP.

Figure 2A:
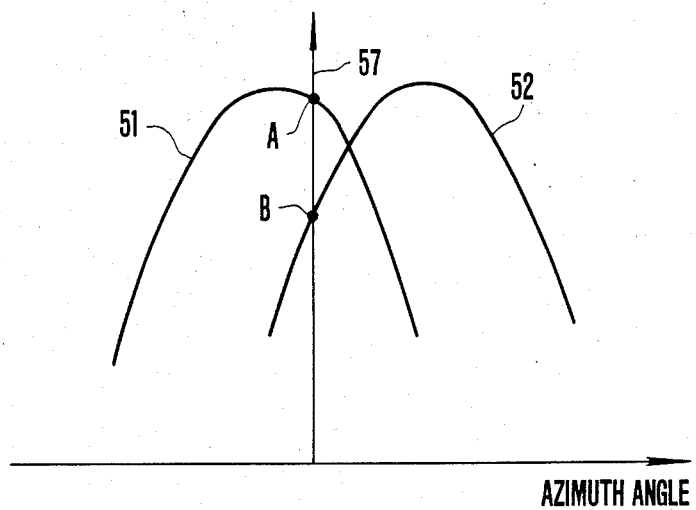
FIGS. 2a and 2b are graphs showing amplitude pattern of a target in the prior art radar system and the embodiment of the invention, respectively.
Figure 2B:
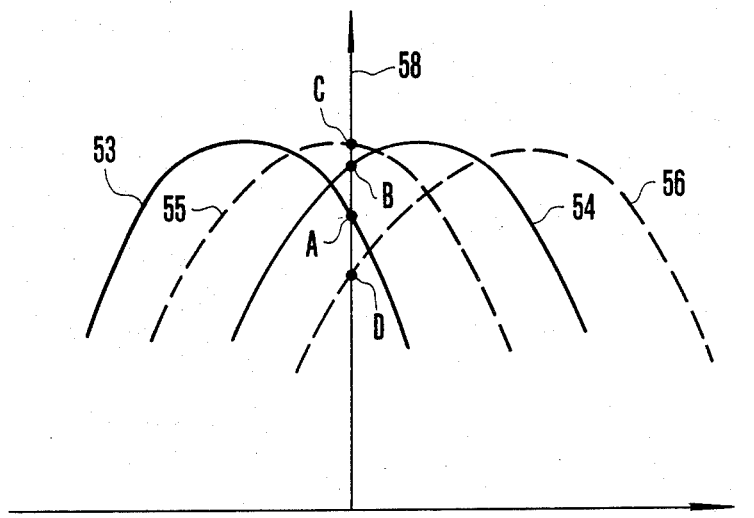

FIG. 2b shows the amplitude levels of beam-to-beam amplitude comparison according to the invention. Reference numbers 53 and 54 show the amplitude pattern of a target and points A and B represent the target amplitude levels in successive processed video extracted from the sets of signals 100-1 to 100-n with the PRP of T1. Reference numerals 55 and 56 also show the amplitude pattern of a target and points C and D represent the target amplitude levels in successive processed videos extracted from the sets of signals 200-1 to 200-n with the PRP of T2. In the figure, the ordinate line 58 shows the angular position of the given moving target. If the blind speed occurs in the PRP of T2, the points C and D in FIG. 2b do not have enough amplitude levels for angle measurement. Even in such a case, however, the levels represented by the points A and B corresponding to signals in the sets with the PRP of T1 can be effectively used as the reference levels to permit normal angle measurement for the given moving target. Of course in the case when the PRP of T1 causes the blind speed, the angle 58 can be detected with reference to the levels represented by the points C and D in FIG. 2b.

As has been described in the foregoing, with the radar system according to the invention, the angular position of a given moving target can be normally detected at all times irrespective of the blind speed.

What is claimed is:

1. A radar system comprising:
   means for forming a transmission pulse signal as m (m being an integer greater than unity) sets of n pulses, the individual sets having respective PRPS TI (i=1, 2, . . ., m);
   moving target detection means having an MTI canceller, a plurality of multi-doppler filters which separate an output signal of said MTI canceller in accordance with doppler frequencies and a constant false alarm rate (CFAR) processor which applies a CFAR processing to an output of each of said multi-doppler filters; and
   angle measurement means utilizing beam-to-beam amplitude comparison and interpolation for a given moving target, said beam-to-beam amplitude comparison and interpolation being carried out at least twice for one target by making use of a pair of video signals with the same PRP processed by said moving target detection means, said angle measurement being achieved through a predetermined correlation processing over thus obtained interpolated angle values for a target.

* * * * *